M. R. MANGAN.
FABRIC LINK.
APPLICATION FILED JULY 19, 1915.
1,184,763.
Patented May 30, 1916.
2 SHEETS—SHEET 1.
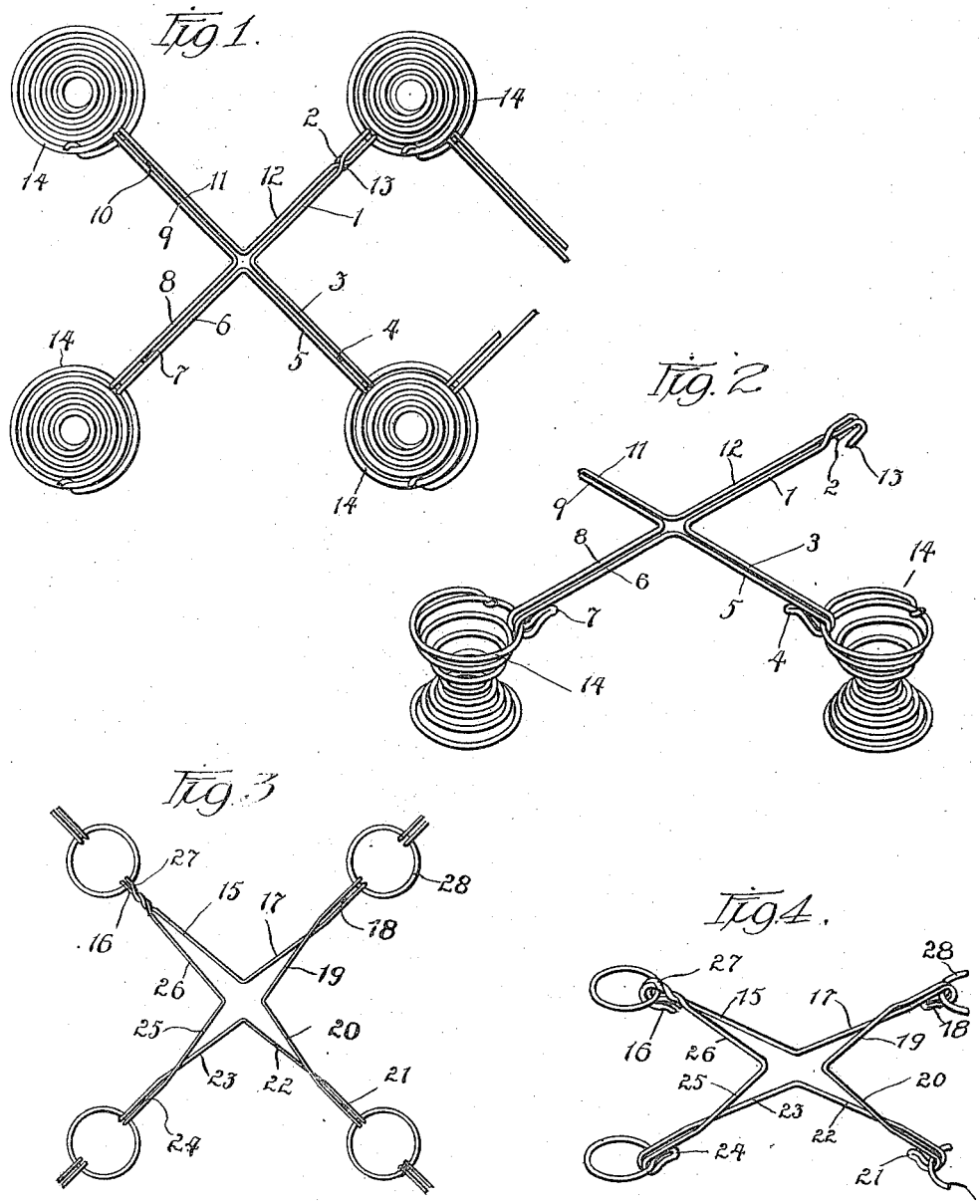
Witnesses
Arthur W. Carlson
Robert H. Weir
Inventor
Michael R. Mangan
By Hill & Hill
Attys.

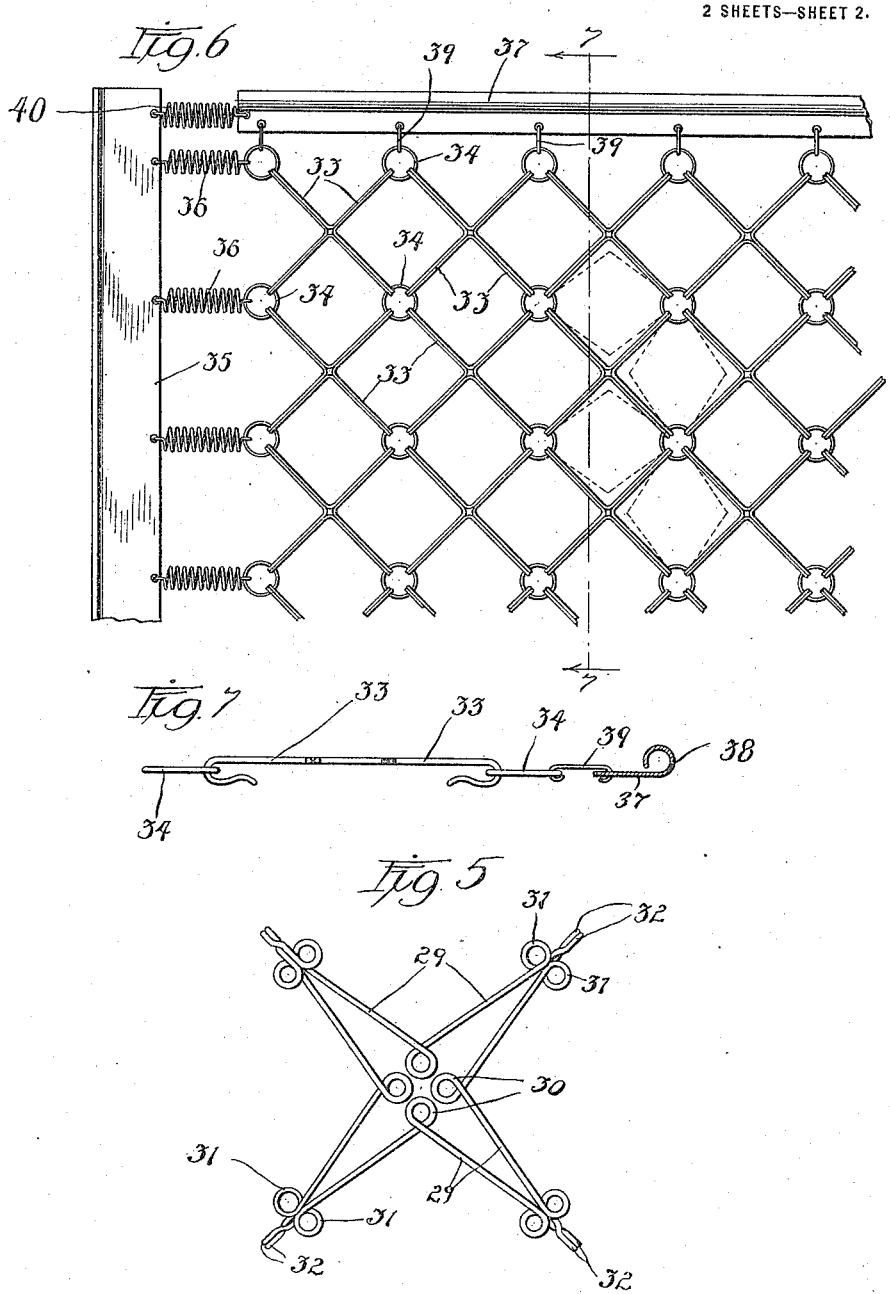

UNITED STATES PATENT OFFICE.

MICHAEL R. MANGAN, OF CHICAGO, ILLINOIS.

FABRIC LINK.

1,184,763.　　　　Specification of Letters Patent.　　Patented May 30, 1916.

Application filed July 19, 1915.　Serial No. 40,745.

*To all whom it may concern:*

Be it known that I, MICHAEL R. MANGAN, a citizen of the United States, residing at Chicago, in the county of Cook and State of Illinois, have invented certain new and useful Improvements in Fabric Links, of which the following is a description.

My invention belongs to that general class of devices known as fabric links for wire fabrics, intended to be used in wire mattresses, upholstered furniture, and the like.

The invention has among its objects the production of a link of the kind described that is simple, efficient, durable, and satisfactory, for use wherever found applicable.

To this end my invention consists in the novel construction, arrangement and combination of parts herein shown and described, and more particularly pointed out in the claims.

In the drawings, wherein like reference characters indicate like or corresponding parts, Figure 1 is a plan view of one form of link, attached to suitable connecting members; Fig. 2 is a perspective view of a portion of the same; Fig. 3 is a plan view of another form; Fig. 4 is a perspective view of the same; Fig. 5 is a plan view of another form; Fig. 6 is a plan view of a plurality of links of Fig. 1, illustrating a portion of a fabric made up thereof; and Fig. 7 is substantially a sectional view of a portion of the same, taken on line 7—7 of Fig. 6, from the upper part.

Referring to the drawings, the link shown in Figs. 1, 2, 6 and 7 consists of a wire of some resiliency, formed with a hook 2 at one end. The wire 1 is extended for the desired length, and thence offset laterally as at 3 at substantially a right angle to the part 1, and thence bent transversely and looped to form a hook 4, the same being further extended in a similar manner at 5, 6, thence looped at 7, and extended as at 8, 9, and looped at 10, thence at 11, 12, and bent over as at 13 to correspond with the hook 2. It will be particularly noted that the extended parts 3 and 5, 6 and 8, 9 and 11, and 1 and 12 are substantially closed together, and preferably but not necessarily arranged parallel and in alinement, as shown, forming a cross-shaped member. It may be mentioned that the arms of the cross need not all be of the same length or dimensions. The two extreme ends of the wire forming the stay or link may be crossed, as indicated in Figs. 1 and 2 which acts the same as tying the ends together. The ends, however, may be tied together or secured in any equivalent manner.

Broadly, the link may be said to consist of a plurality of resilient arms approaching a common center and disconnected from each other thereat with the ends of the arms arranged to engage a coöperating part.

The links are used in a fabric, either for a mattress or in upholstered work, for connecting the springs together, or they may be connected to links or the equivalent, which serves to connect the several links of the fabric, both constructions being shown in the drawings.

In Figs. 1 and 2, I have shown the links as connecting coil springs 14. It is, of course, understood that the hooked or looped ends 2, 13, 4, 7 and 10 may be so bent after the fabric is assembled as to substantially lock the parts together.

In the form shown in Fig. 3, the link is substantially similar except each extending part is crossed as shown in Figs. 3 and 4. Referring to this form, 15 has the free end 16 turned down to form a hook, and extended as at 17, and looped at 18, thence extended as at 19, and as at 20, 22, 23, 25, 26 and looped at 21 and 24, and the end turned down at 27 similar to 16. It will be noted that the wires cross at or near the looped ends. These wires may cross or be twisted at the top or bend, that is, near the hook or loop. The results are substantially the same, although the link is not quite as flexible as the construction previously described.

The link shown in Fig. 5 is similar to the other two forms shown, except that the extended parts or wires 29 are shown looped at 30, and in addition, looped at 31, thence crossed and turned down at 32 to form a hook. Either of the loops 30 or 31 may be omitted if desired and the link may be otherwise modified.

Referring to Figs. 6 and 7, a plurality of links 33, similar to the links shown in Figs. 1 and 2, or similar to the other forms, if preferred, are assembled and connected by rings 34; 35 is the end of a fabric mattress and the fabric consisting of the links and rings 34, is resiliently connected to the end or frame 35 by springs 36, or other equivalents. Arranged on each side of the fabric (only one side being shown) is a side bar 37, the outer edge of the same being preferably turned up as at 38 (Fig. 7). The rings 34 along the side bars 37 (only one shown) are connected to the side bars by links 39, or their equivalents for the purpose. The side bar is also preferably connected to an end bar 35, by a coil spring 40, or its equivalent, arranged at each end of the fabric.

When a weight is put on the fabric the links all tend to give at the center, substantially as indicated by the dotted lines in Fig. 6. The weight, however, is equalized about the fabric. The side bar 37 affords a straight edge to the fabric, making the same more comfortable, particularly when the same is a mattress, sanitary couch, or the like, and the user sits at the edge of the same. The edge of bar 37 being turned up, as shown, the same is comfortable to the user when seated at the edge, as previously set forth.

The fabric may be made up by employing coil springs 14 shown in Figs. 1 and 2, it being understood that these may be used in the fabric shown in Fig. 6 in place of the rings 34, one being the equivalent of the other in so far as securing the links together. Coil springs 14, however, are particularly intended for use in upholstered seats, as couches, chairs, and the like. Regardless of their use, however, a comfortable fabric is produced without rigid and unyielding links, but on the other hand, with a great deal of flexibility, as well as durability.

Having thus described my invention, it is obvious that various immaterial modifications may be made in the same without departing from the spirit of my invention; hence I do not wish to be understood as limiting myself to the exact form, construction, arrangement and combination of parts herein shown and described, and uses mentioned.

What I claim as new and desire to secure by Letters Patent is:—

1. A yieldable link of the kind described, consisting of a single integral piece of wire bent to form four arms approaching a common center, but disconnected from each other thereat, each arm comprising two strands of the wire normally lying substantially close together, and having its free end constructed to engage a coöperating part, the two extreme ends of the wire constituting one of said arms, and secured together adjacent the end of the arm.

2. A fabric link of spring wire, bent upon itself to form a plurality of arms approaching a common center, but disconnected from each other thereat, each arm comprising two strands of wire, one crossing over the other between the center and the free end, with the free end of the arm constructed to engage a coöperating part.

3. A fabric link of spring wire bent upon itself to form a plurality of arms, approaching a common center, but disconnected from each other thereat, each arm comprising two strands of wire, each provided with a loop near the center and with the free end of the arm constructed to engage a coöperating part.

4. A fabric link of spring wire, bent upon itself to form a plurality of arms approaching a common center, but disconnected from each other thereat, each arm comprising two strands of wire, each of which is provided with a loop near the center and also near the free end of the arm, said free end of the arm being constructed to engage a coöperating part.

In testimony whereof, I have hereunto signed my name in the presence of two subscribing witnesses.

MICHAEL R. MANGAN.

Witnesses:
L. M. BALDWIN,
CHARLES I. COBB.

Copies of this patent may be obtained for five cents each, by addressing the "Commissioner of Patents, Washington, D. C."